United States Patent [19]

Callaway

[11] Patent Number: 5,564,232
[45] Date of Patent: Oct. 15, 1996

[54] TARPAULIN HOLDDOWN DEVICE

[75] Inventor: Robert D. Callaway, Grand Rapids, Mich.

[73] Assignee: Acorn Landscaping and Property Maintenance, Inc., Grand Rapids, Mich.

[21] Appl. No.: 394,674

[22] Filed: Feb. 24, 1995

[51] Int. Cl.$^6$ .................................................. A45F 3/44
[52] U.S. Cl. ...................... 5/4; 52/155; 5/417; 135/118; 135/119; 135/120.3
[58] Field of Search .................................. 135/118, 119, 135/120.3; 52/3, 4, 155; 5/417; 411/513

[56] References Cited

U.S. PATENT DOCUMENTS

| | | | |
|---|---|---|---|
| 1,268,459 | 6/1918 | Hjermstad. | |
| 1,526,726 | 2/1925 | Townsend. | |
| 1,583,039 | 5/1926 | Wickstrum. | |
| 2,775,252 | 12/1956 | Finch. | |
| 2,809,006 | 10/1957 | Jansey. | |
| 2,809,066 | 10/1957 | Jansey | 5/417 X |
| 2,817,346 | 12/1957 | Whitney. | |
| 2,835,017 | 5/1958 | Hoerr. | |
| 2,840,092 | 6/1958 | Hill. | |
| 3,788,336 | 1/1974 | Steffes | 52/155 X |
| 3,938,344 | 2/1976 | Asayama | 52/155 X |
| 4,420,918 | 12/1983 | Arnoux et al. | 52/155 X |
| 4,580,372 | 4/1986 | Osborn | 52/3 |
| 4,756,128 | 7/1988 | Danieli. | |
| 4,986,373 | 1/1991 | Charland et al. | 52/155 X |
| 5,048,240 | 9/1991 | Dupre et al. | 52/4 |
| 5,066,168 | 11/1991 | Holdeman | 52/155 X |
| 5,101,525 | 4/1992 | Ippolito | 135/118 X |
| 5,148,641 | 9/1992 | Rushing et al. | 52/155 X |
| 5,299,331 | 4/1994 | Badillo | 5/417 |
| 5,322,386 | 6/1994 | Trangsrud | 52/155 X |
| 5,372,457 | 12/1994 | Rante | 52/155 X |

FOREIGN PATENT DOCUMENTS

| | | | |
|---|---|---|---|
| 03170311 | 12/1956 | Switzerland | 52/155 |
| 101911 | 10/1911 | United Kingdom. | |

OTHER PUBLICATIONS

Cover and p. 15, *A. M. Leonard, Inc. Catalog*, Summer 1993, showing Anchor Pins and Re–pins.

Exhibit A, Photographs of tarpaulin secured to ground with stick in use for more than 1 year prior to filing of this application.

*Primary Examiner*—Wynn E. Wood
*Attorney, Agent, or Firm*—Van Dyke, Gardner, Linn & Burkhart, LLP

[57] ABSTRACT

A tarpaulin holddown device or retainer having a handle and a shaft, with a pointed or tapered tip at the end of the shaft. The tarp retainer has a stop member positioned along the shaft between the handle and tip, and a narrow hole extending through the shaft slightly below the stop. When used to fasten a grommeted tarpaulin to a soft soil or tufted area, the tarp retainer is placed through the grommet until the stop contacts the tarp. A retaining clip or O-ring is then inserted into the narrow hole in the shaft underneath the tarp, to hold the tarp retainer in place. The tarp retainer is then easily inserted into or removed from the ground by hand by pushing down or pulling up on the handle, thereby holding the tarp to the ground for collecting and moving debris while conveniently staying with the tarp in position for reuse when the tarp is moved.

32 Claims, 2 Drawing Sheets

TARPAULIN HOLDDOWN DEVICE

BACKGROUND OF THE INVENTION

The present invention relates to holddown devices, particularly those for use in securing tarpaulins and the like on to soft soil or turfed areas.

In the landscaping industry, a need often arises for the removal of large volumes of materials or debris, such as leaves, grass clippings, etc. from a worksite, typically outdoors. One method of accomplishing such removal involves spreading a tarpaulin or tarp on to a surface next to the material or debris, blowing, raking, or otherwise transferring the material or debris from the surrounding area on to the tarp, rolling or folding the tarp and then transporting the tarp with debris to a disposal area where the materials and debris are unloaded.

This method has proven to be inefficient and cumbersome in several respects. If blowers are used to transfer the debris on to the tarp, or if it is a breezy or windy day, the tarp will not remain in its flat, spread out position. This makes it difficult to place the materials on the tarp, and those that have been successfully placed may become dislodged or blown off. To combat this problem, typically one or more sticks or twigs are located at the worksite and either pushed through the tarp into the soil or used to wedge the corners of the tarp into the ground. This method has also proven unsuccessful, in that it is often difficult to find sticks that are long and strong enough to hold a tarp firmly in place. To find the necessary number of suitable sticks is very time-consuming. It is also difficult to push such sticks or twigs in the ground. Many times the stick will break off in one's hand, or the end of the stick will break off in the ground and be unremovable. Even if the sticks are securely positioned to hold the tarp, these sticks may be lost when the tarp is rolled or folded and then subsequently emptied. This latter problem exists even for traditional metal stakes or spikes.

Other stakes have been tried, but have been ineffective for a number of reasons. These stakes are usually too long, and are therefore cumbersome to work with. Conventional stakes are also too thin, resulting in a loose fit between the tarp and the stake. This loose fit allows the tarp to shift not only horizontally, but also to travel vertically up the stake due to wind or blowing, each of which could cause the debris to be dislodged from the tarp. Finally, these stakes are not provided with any means for securing the stake to the tarp, to allow the stake to stay with the tarp when moved or transported.

Another problem is that often times the terrain of the area will be such as to leave gaps or open areas between the tarp and the soil surface. If the material to be removed is placed on the tarp, for example, by means of a blower, much of the debris may actually end up going through these gaps and coming to rest underneath the tarp rather than on top of the tarp. In this case, it may be necessary to securely fasten the tarp not just in one or more corners, but also at several points throughout the tarp. This requires locating many more sticks or twigs, and adds even more time to an already lengthy process, in that, even if an adequate number of sticks are gathered, they must all be firmly positioned around the tarp, with the attendant risks of breaking, coming free from the tarp, being lost in disposal, etc. Staking a tarp in place usually creates more work than periodically repositioning the tarp, which accounts for its lack of widespread use. Resort has even been made to positioning various workers around the periphery of the tarp, who hold the tarp in place by standing on it. This is obviously an inefficient use of time and resources.

SUMMARY OF THE INVENTION

In the present invention, a tarpaulin holddown device or retainer is provided for use in securing a tarpaulin. The retainer comprises a handle and a shaft with a pointed tip. The shaft has a stop positioned along the shaft. A retaining member extends outwardly from the shaft at a position spaced from the stop member. When placed through an opening in a tarp, the stop contacts the top of the tarp, while retaining member holds the retainer securely to the tarp. The pointed tip allows the retainer to be easily pushed by hand into the ground, and the handle allows for quick removal of the retainer. However, the retainer stays with the tarp, even when moving debris, thereby keeping the retainer readily available for reuse after the tarp is emptied.

In another aspect of the invention, a kit is provided comprising a tarp with a plurality of openings spaced about the periphery of the tarp, along with at least one of the tarpaulin retainers of the present invention.

The tarpaulin retainers of the present invention greatly facilitate the securing, removal, and transporting processes involved in the landscaping, gardening, and property maintenance industries. The retainers assure that the tarp will be held firmly in place, and provide for frequent and easy removal, and yet are conveniently available for reuse.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
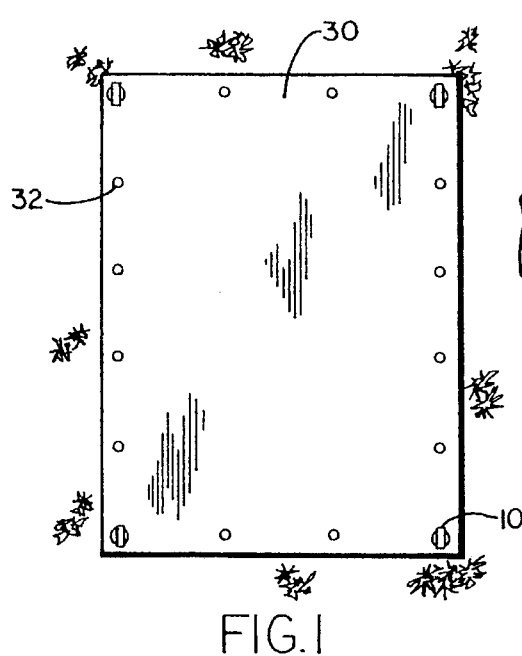
FIG. 1 is a plan view of a tarpaulin with grommets in peripheral openings and tarpaulin retainers positioned at four corners of the tarpaulin in accordance with the present invention.
Figure 2:
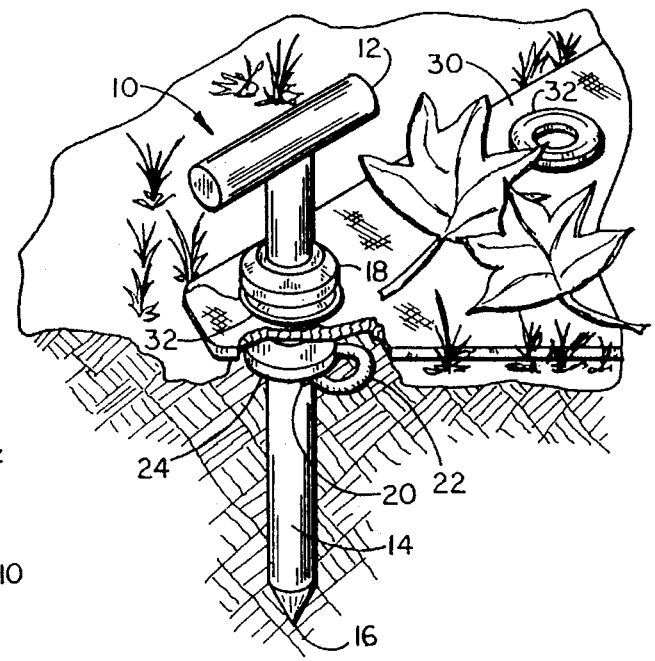
FIG. 2 is a perspective view of a tarpaulin and a first embodiment of a tarpaulin retainer in accordance with the present invention with portions of the tarpaulin broken away revealing insertion of the retainer in the ground to hold the tarpaulin.
Figure 8:
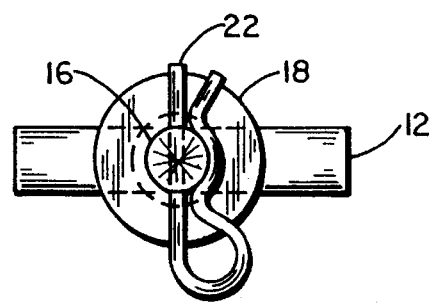
FIG. 8 is a bottom view of the tarpaulin retainer, with the fastener/retaining clip.
Figure 9:
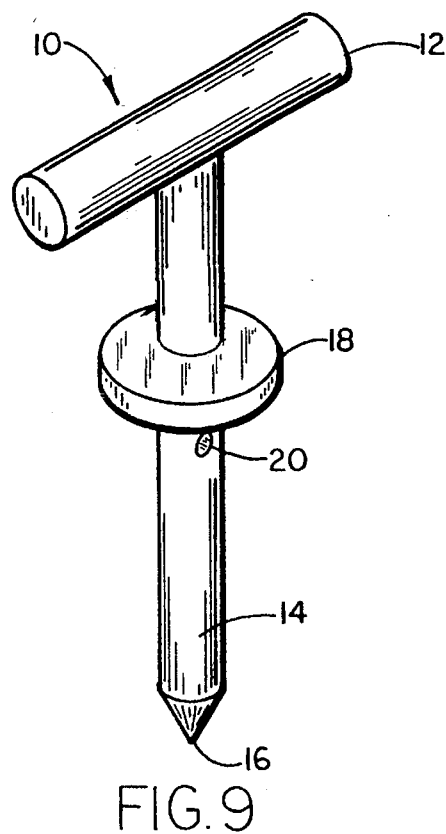
FIG. 9 is a perspective view of a second modified form of the tarpaulin retainer, including a modified stop member.
Figure 10:
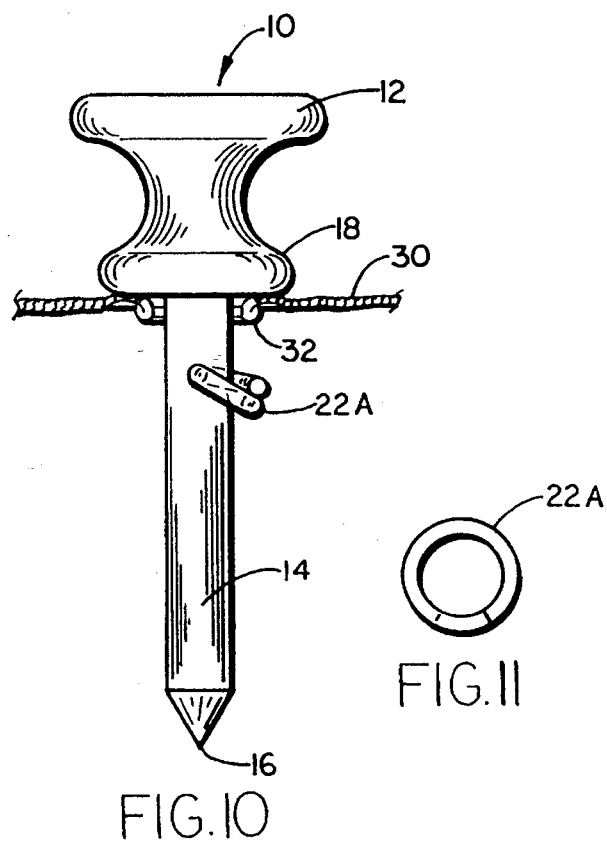
FIG. 10 is an elevation of a third modified form of the tarpaulin retainer, showing a modified handle and stop member design.

In the preferred embodiment, a tarpaulin holddown device or retainer is provided, shown generally in FIGS. 2, 3, 6–10, and 12 and depicted by the numeral 10. The tarp retainer or pin 10 is used to secure a tarpaulin 30 to a soft soil or turfed area, by inserting a tarp retainer(s) through one or more grommets 32 in tarp 30, as shown in FIGS. 1, 2, and 10. The tarp retainer 10 efficiently facilitates the process of temporarily securing, removing, and transporting a tarp 30, particularly when disposing of large volumes of material or debris from a worksite.

Tarp retainer 10 is provided with a cylindrical handle 12 and a cylindrical shaft 14 extending therefrom. Shaft 14 extends downwardly and is preferably substantially perpendicular to handle 12 as shown, for example, in FIG. 3. Handle 12 may be of any suitable size and shape, but is preferably configured so as to allow for easy grasping by a user. When used to secure a tarp to a turfed surface, handle 12 should be substantially parallel to the tarp and the underlying surface, as shown in FIG. 2. Handle 12 is preferably of a width that allows a user's fingers to be wrapped firmly around handle 12, and of a length such as to permit a user's pointer and middle fingers to rest on one side of shaft 14, and ring and pinky fingers to rest on the other side of shaft 14. Handle 12 may be rounded, as shown in FIG. 9, square, or any other suitable configuration. It is preferable that handle 12 have a sufficiently large surface area on top to allow tarp retainer 10 to be firmly and easily pushed into the soil surface by hand, without the need for any tools such as a hammer. Handle 12 is also shaped in such a way as to permit frequent and easy removal by hand, again without resorting to any mechanical aids.

Shaft 14 may be of any desired length, but should not be too short so that it only penetrates a small distance into the ground and risks detachment of the tarp retainer from the soil, nor should shaft 14 be too long such that tarp retainer 10 becomes difficult to remove once in place or is cumbersome to work with and carry around, particularly when left in place on a tarp during transportation. Preferably, shaft 14 is between two (2) and six (6) inches long. Shaft 14 is preferably rounded and cylindrical, and has a diameter which allows placement within a standard grommet in a conventional tarp. The diameter of shaft 14 preferably provides a relatively snug fit between a grommet 32 and shaft 14, to keep tarp 30 from shifting or moving to any measurable degree.

Handle 12 and shaft 14 can be of any suitable material, such as wood, plastic, or metal. Handle 12 and shaft 14 may be of one piece, or may be two pieces affixed to each other. For example, handle 12 and shaft 14 may be a molded, one-piece, resinous plastic construction, or separate wood pieces joined by a screw through the handle and into the shaft, or separate metal pieces welded together.

Shaft 14 is provided at its end opposite handle 12 with a tapered or pointed end or tip 16. Tip 16 may be of the same material as shaft 14, or it may be of a different material. For example, if shaft 14 is made of wood, tip 16 could also be of wood, or it could be a metal material. The pointed or tapered shape of tip 16, along with the surface area of handle 12, allows for the frequent and easy insertion of tarp pin 10 into a soft soil or turfed area.

Figure 7:
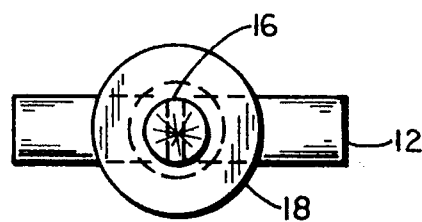
FIG. 7 is a bottom view of the tarpaulin retainer, without a fastener/retaining member or washer.

Shaft 14 is provided along its length with stop member 18. Stop 18 is fixedly positioned along shaft 14 between handle 12 and tip 16, preferably between handle 12 and the midway point of shaft 14. When tarp retainer 10 is positioned through grommet 32 of tarp 30, stop 18 contacts the top or outer exposed surface of tarp 30. Stop 18 may be of any suitable size and shape. Preferably, stop 18 extends outwardly and downwardly away from either side of shaft 14 at a diagonal angle, away from handle 12 and towards tip 16. Stop 18 preferably has an annular, flat bottom surface, such that the overall shape of stop 18 is substantially cone-like. Stop 18 can extend to any desired diameter, but is preferably no wider than the length of handle 12. Referring to FIG. 7, looking at tarp retainer 10 from the bottom or tip view, one can see tip 16, then the annular bottom surface of stop 18 which has a diameter greater than that of shaft 14, but less than the length of handle 12, which can be seen extending outwardly on either side of stop 18.

Shaft 14 is further provided with a hole or narrow channel 20, which runs substantially parallel to handle 12 and perpendicular to the axis of shaft 14. Hole 20 should be of sufficient diameter to receive a removable fastener or retaining member such as a clip or O-ring. Hole 20 is spaced between stop 18 and tip 16 along shaft 14, but is preferably much closer to stop 18. Hole 20 is preferably spaced from stop 18 by a distance that is slightly greater than the thickness of a conventional grommeted tarp, with some space being provided for the optional placement of a washer along the shaft below tarp 30 but above hole 20. Most preferably, hole 20 is spaced along shaft 14 at a distance of one-fourth (¼) of an inch below stop 18.

Figure 3:
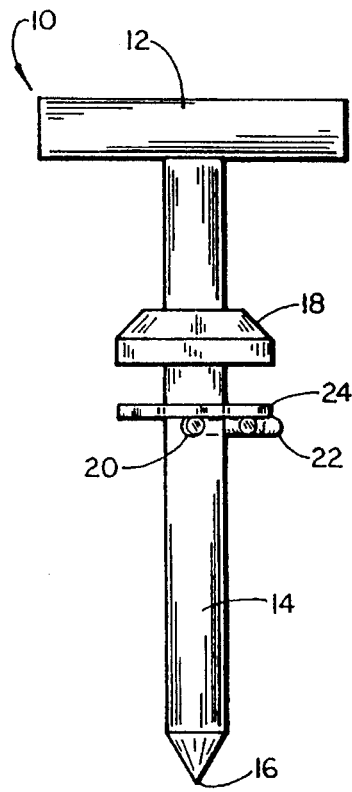
FIG. 3 is an elevation of the tarpaulin retainer of FIG. 2.
Figure 4:
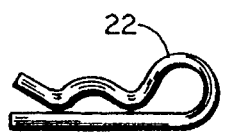
FIG. 4 is a plan view of a fastener/retaining clip member for use in the invention.
Figure 5:
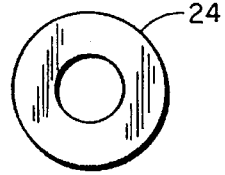
FIG. 5 is a plan view of a washer for use in the invention.
Figure 11:
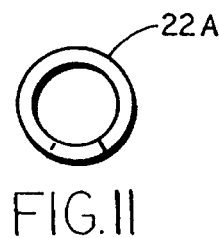
FIG. 11 is a plan view of an O-ring fastener/retaining member.

Any suitable fastener or retaining member can be placed through hole 20 below tarp 30 to hold tarp retainer 10 firmly in place. Preferably, fastener or retaining member 22 is a removable, resilient, spring-like clip member, best seen in FIGS. 4 and 8, or a removable, split, O-ring member 22A as shown in FIGS. 10 and 11. Tarp retainer 10 with fastener/retaining clip member 22 is shown in FIGS. 3 and 8, and with fastener/retaining O-ring member 22A in FIG. 10. Optionally, washer 24, shown in FIG. 5, can be placed above hole 20 and between fastener/retaining member 22 and tarp 30 for a tighter fit.

Other fasteners/retaining members can also be used and require no particular configuration as long as they extend outwardly of the shaft a sufficient distance to resist removal of tarp from the shaft. Thus, flexible rubber or synthetic O-rings fitted around shaft 14 in a groove or the like may also be used. If shaft 14 is formed by molding a resilient material, fastener/retaining member could be provided as a molded, protruding surface along shaft 14.

Figure 6:
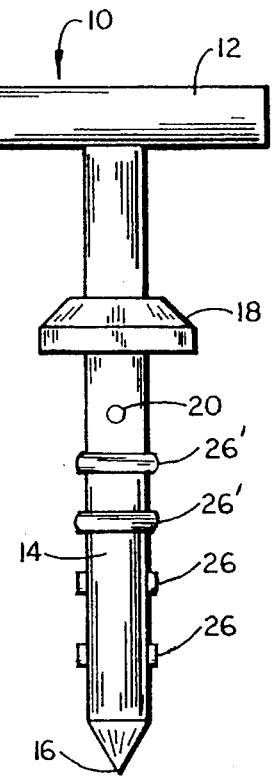
FIG. 6 is an elevation of a modified form of the tarpaulin retainer.

Shaft 14 may also optionally be provided with a plurality of ribs 26, 26' that extend outwardly from shaft 14 and substantially perpendicular thereto, shown in FIG. 6 as a first alternate embodiment. Ribs 26' may be annular in shape, extending around the entire diameter of shaft 14, or ribs 26 may be individual cylindrical, or other shaped projections extending outwardly from shaft 14. Ribs 26, 26' should extend to a length which is sufficient to provide increased frictional resistance to movement for tarp retainer 10 in soil, but should not be so long that removal of tarp retainer 10 becomes overly difficult or impossible. Ribs 26, 26' should not extend to a length which would prevent insertion of tarp retainer 10 through a standard grommet.

In operation, tarp retainer 10 is placed through grommet 32 in tarp 30 until stop 18 contacts the top or outer surface of tarp 30 and grommet 32. Next, washer 24 can optionally be placed over tip 16 and slid up shaft 14 until contacting the undersurface of tarp 30 and grommet 32. Fastener/retaining member 22 or 22A is then inserted into hole 20. In this configuration, stop 18 prevents tarp retainer 10 from moving in one direction with respect to tarp 30, and fastener/ retaining member 22 or 22A prevents tarp retainer 10 from moving in the opposite direction.

This procedure can be repeated with additional tarp retainers, depending on the number of grommets 32 in the particular tarp. Typically, a rectangular or square conventional tarp has grommets at each of its four corners, and additional grommets about its outer periphery at distances of two (2) to three (3) feet apart, as shown in FIG. 1. The number of tarp retainers necessary will depend on a variety of factors, including the particular terrain, the weather conditions, and the means for transferring the material or debris to be collected on to the tarp. However, as is often the case, tarp retainers are typically used at the two corners closest to the blower or rake, although fastening at the remaining corners or along the sides of the tarp is also possible.

Once tarp 30 has been suitably placed near the worksite and the desired number of tarp retainers are in place, tarp retainers 10 are then pushed into the soil or ground by hand, applying pressure to the top of handle 12, causing tip 16 to penetrate the turf or soil until tarp 30 is firmly secured to the ground, as shown in FIG. 2. Tarp retainer 10 is held in place by the displaced soil and the root system of the grass, sod, or turf. The material or debris is then blown or otherwise transferred on to the top surface of tarp 30. Once sufficiently full or covered, tarp 30 may be rolled up or folded, and then transported to a disposal site. It is most convenient to simply leave tarp retainers 10 affixed to tarp 30 during this process, so that tarp retainers 10 will not have to be declipped and reclipped each time tarp 30 is used. However, it may be necessary to remove tarp retainers 30 for storage or to replace a tarp retainer should it become damaged, or if it is desired to use the tarp retainer with a different tarp.

In a second alternate embodiment, stop 18 is a substantially round, flat member positioned on shaft 14, perpendicular thereto, as shown in FIG. 9. In this embodiment, stop 18 is disc-shaped, as opposed to the cone-shaped stop member shown in FIG. 3.

In a third alternate embodiment, handle 12 and stop 18 form one integral piece, rather than being spaced apart along shaft 14, as shown in FIG. 10. In this configuration, the top of handle 12 is flat and round. Handle 12 extends inwardly and downwardly at a sloping, curved angle, reaching a minimum diameter, and then extends outwardly and downwardly to form stop 18. The bottom of stop 18 is also round and flat. This provides an integral one-piece handle 12 and stop 18 configuration that is basically hour-glass shaped. The minimum diameter forms a tapered midpoint between handle 12 and stop 18, providing a convenient grasping area for removal of tarp retainer 10 by hand.

Figure 12:
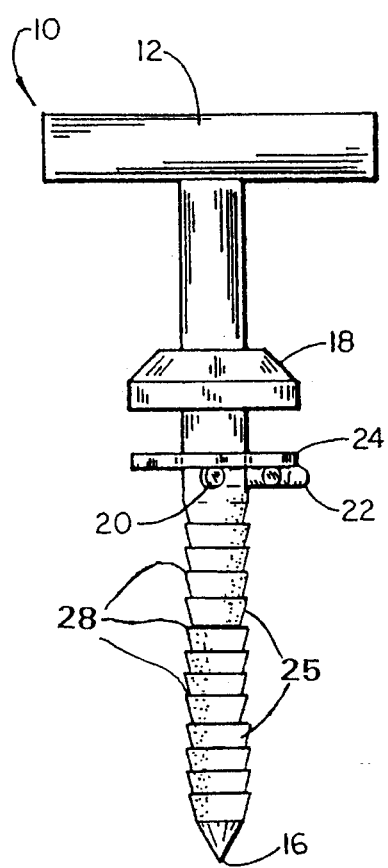
FIG. 12 is an elevation of a fourth modified form of the tarpaulin retainer showing a modified shaft design.

In a fourth alternate embodiment, shaft 14 is provided with another form of annular ribs, namely, a series of aligned, inverted conical recesses or indentations 25 each having an annular ledge or shoulder 28, as shown in FIG. 12. Each recess extends around the complete circumference of shaft 14. Recesses 25 and shoulders 28 provide increased frictional resistance to movement for tarp retainer 10 in soil, but do not impede in any way the insertion of tarp retainer 10 through a standard grommet since the outer diameter of each shoulder 28 is the same as that of shaft 14.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A tarpaulin retainer, said retainer comprising:

a handle;

a shaft extending from said handle, said shaft having a tip at one end opposite said handle, said shaft adapted to be received in an opening in a tarpaulin and inserted in the ground to hold the tarpaulin in place;

a stop member, positioned along said shaft between said handle and said tip and adapted to contact and hold a tarpaulin against the ground when said retainer is received in a tarpaulin opening; and a removable retaining member extending outwardly of said shaft at a position spaced from said stop member between said stop member and said tip for holding said retainer on a tarpaulin, said shall removably receiving said retaining member thereon whereby when said shall is received through the opening in the tarpaulin, said removable retaining member is mounted on said shaft to resist removal of said retainer from the tarpaulin, but is removed from said shaft when removal of said retainer from the tarpaulin is desired.

2. The tarpaulin retainer of claim 1, wherein said shaft extends perpendicular to said handle.

3. A tarpaulin retainer said retainer comprising:

a handle;

a shaft extending from said handle, said shaft having a tip at one end opposite said handle, said shaft adapted to be received in an opening in a tarpaulin;

a stop member, positioned along said shaft between said handle and said tip and adapted to contact and hold a tarpaulin against the ground when said retainer is received in a tarpaulin opening; and a retaining member extending outwardly of said shag at a position spaced from said stop member between said stop member and said tip for holding said retainer on a tarpaulin:

said shaft including a hole positioned between said stop member and said tip; said retaining member including a fastener positioned in said hole.

4. The tarpaulin retainer of claim 3, wherein said fastener is a removable clip.

5. The tarpaulin retainer of claim 3, wherein said fastener is a removable O-ring.

6. The tarpaulin retainer of claim 1, further comprising a washer positioned between said stop member and said retaining member.

7. The tarpaulin retainer of claim 1, further comprising a plurality of rib members, extending radially about said shaft.

8. The tarpaulin retainer of claim 7, wherein said rib members are projections.

9. The tarpaulin retainer of claim 7, wherein said rib members are annular.

10. The tarpaulin retainer of claim 1, wherein said stop member is a round, flat member positioned on said shaft and perpendicular thereto.

11. The tarpaulin retainer of claim 1, wherein said handle and said stop are joined together to form one integral member.

12. The tarpaulin retainer of claim 1, wherein said shaft is provided with a series of aligned, inverted conical indentations.

13. The tarpaulin retainer of claim 1, wherein said shaft is two to six inches in length.

14. A tarpaulin and tarpaulin retainer assembly, said assembly comprising:
- a tarpaulin having a periphery with a plurality of openings positioned therealong, said tarpaulin also having a top surface and an undersurface;
- at least one tarpaulin retainer inserted in one of said openings and affixed to said tarpaulin, said tarpaulin retainer comprising:
- a handle;
- a shaft connected at one end to said handle and extending therefrom, said shaft having a tip at the end opposite said handle and adapted to be inserted in the ground to hold said tarpaulin in place;
- a stop member, positioned along said shaft between said handle and said tip, said stop member contacting said top surface of said tarpaulin to hold said tarpaulin against the ground when said shaft of said tarpaulin retainer is inserted in said opening and then into the ground; and
- a removable retaining member extending outwardly of said shaft, said retaining member being positioned next to said undersurface of said tarpaulin to hold said tarpaulin retainer on said tarpaulin, said shaft removably receiving said retaining member thereon whereby said removable retaining member is mounted on said shaft to resist removal of said retainer from said tarpaulin but is removed from said shaft when removal of said retainer from said tarpaulin is desired.

15. The assembly of claim 14, wherein said opening includes a grommet affixed to said tarpaulin; said shaft having a diameter conforming to that of the inner diameter of said grommet to provide a tight fit between said tarpaulin retainer and said tarpaulin.

16. A tarpaulin and tarpaulin retainer assembly, said assembly comprising:
- a tarpaulin having a periphery with a plurality of openings positioned therealong, said tarpaulin also having a top surface and an undersurface;
- at least one tarpaulin retainer inserted in one of said openings and affixed to said tarpaulin, said tarpaulin retainer comprising:
- a handle;
- a shaft connected at one end to said handle and extending therefrom, said shaft having a tip at the end opposite said handle;
- a stop member, positioned along said shaft between said handle and said tip, said stop member contacting said top surface of said tarpaulin when said shaft of said tarpaulin retainer is inserted in said opening; and
- a retaining member extending outwardly of said shaft, such that said retaining member is positioned next to said undersurface of said tarpaulin to hold said tarpaulin retainer on said tarpaulin;
- said shaft including a hole positioned between said stop member and said tip; said retaining member including a fastener positioned in said hole.

17. The assembly of claim 16, wherein said fastener is a removable clip.

18. The assembly of claim 16, wherein said fastener is a removable O-ring.

19. The assembly of claim 14, further comprising a washer positioned between said tarpaulin and said retaining member.

20. The assembly of claim 14, wherein said tarpaulin retainer has a plurality of rib members, extending outwardly of said shaft.

21. The assembly of claim 20, wherein said rib members are projections.

22. The assembly of claim 20, wherein said rib members are annular.

23. The assembly of claim 14, wherein said stop member is a round, flat member positioned on said shaft and perpendicular thereto.

24. The assembly of claim 14, wherein said handle and said stop member are joined together to form one integral member.

25. The assembly of claim 14, wherein said shaft is provided with a series of aligned, inverted conical indentations.

26. A tarpaulin and tarpaulin retainer kit, said kit comprising:
- a tarpaulin having a plurality of openings positioned along the periphery of said tarpaulin, said tarpaulin also having a top surface and an undersurface;
- at least one tarpaulin retainer adapted to be inserted into one of said openings and affixed to said tarpaulin to secure said tarpaulin to the ground, said tarpaulin retainer comprising:
- a handle;
- a shaft connected at one end to said handle and extending therefrom, said shaft having a tip at the end opposite said handle and adapted to be inserted in the ground to hold said tarpaulin in place;
- a stop member, positioned along said shaft between said handle and said tip, so that upon insertion of said shaft of said tarpaulin retainer in said opening and then into the ground, said stop member contacts said top surface of said tarpaulin to hold said tarpaulin against the ground; and
- a removable retaining member extending outwardly of said shaft, such that when said tarpaulin retainer is inserted into said opening, said retaining member is positioned next to said undersurface of said tarpaulin, said shaft removably receiving said retaining member thereon whereby when said shaft is received through said opening in said tarpaulin, said removable retaining member is mounted on said shaft to resist removal of said retainer from said tarpaulin, but is removed from said shaft when removal of said retainer from said tarpaulin is desired.

27. The kit of claim 26, wherein said opening includes a grommet affixed to said tarpaulin; said shaft having a diameter conforming to that of the inner diameter of said grommet, so that, upon insertion, a tight fit is provided between said tarpaulin retainer and said tarpaulin.

28. A tarpaulin and tarpaulin retainer kit, said kit comprising:
- a tarpaulin having a plurality of openings positioned along the periphery of said tarpaulin, said tarpaulin also having a top surface and an undersurface;
- at least one tarpaulin retainer adapted to be inserted into one of said openings and affixed to said tarpaulin to secure said tarpaulin to a surface, said tarpaulin retainer comprising:
- a handle;
- a shaft connected at one end to said handle and extending therefrom, said shaft having a tip at the end opposite said handle;
- a stop member, positioned along said shaft between said handle and said tip, so that upon insertion of said shaft of said tarpaulin retainer in said opening, said stop member contacts said top surface of said tarpaulin; and a retaining member extending outwardly of said shaft, such that when said tarpaulin retainer is inserted into said opening, said retaining member is positioned next to said undersurface of said tarpaulin;

said shaft including a hole positioned between said stop member and said tip; said retaining member including a fastener positioned in said hole.

29. The kit of claim 28, wherein said fastener is a removable clip.

30. The kit of claim 28, wherein said fastener is a removable O-ring.

31. The kit of claim 26, further comprising a washer adapted to be positioned between said tarpaulin and said retaining member following insertion of said tarpaulin retainer in one of said openings.

32. The kit of claim 26, wherein said tarpaulin retainer has a plurality of rib members on said shaft.

* * * * *

UNITED STATES PATENT AND TRADEMARK OFFICE
CERTIFICATE OF CORRECTION

PATENT NO. : 5,564,232
DATED : October 15, 1996
INVENTOR(S) : Robert D. Callaway It is certified that error appears in the above-indentified patent and that said Letters Patent is hereby corrected as shown below:

Column 2, line 41:
  ":" should be --;--.
Column 4, line 6:
  "fiat" should be --flat--.
Column 5, line 36:
  "fiat" should be --flat--.
Column 5, line 43:
  "fiat" should be --flat--.
Column 6, line 20:
  "shall" should be --shaft--.
Column 6, line 21:
  "shall" should be --shaft--.
Column 6, line 29:
  Between "retainer" and "said" insert --,--.
Column 6, line 39:
  "shag" should be --shaft--.
Column 6, line 42:
  ":" should be --;--.

UNITED STATES PATENT AND TRADEMARK OFFICE
CERTIFICATE OF CORRECTION

PATENT NO. : 5,564,232
DATED : October 15, 1996
INVENTOR(S) : Robert D. Callaway It is certified that error appears in the above-indentified patent and that said Letters Patent is hereby corrected as shown below:

Column 8, line 41:
  "shalt" should be --shaft--.

Signed and Sealed this

Fourth Day of August, 1998

Attest:

BRUCE LEHMAN

*Attesting Officer*    *Commissioner of Patents and Trademarks*